Patented Jan. 3, 1950

2,493,068

UNITED STATES PATENT OFFICE 2,493,068

N,N'-DIACYL-TETRAHYDRO-1,3,5-OXADIAZINES

Madison Hunt, Claymont, and Harris Walton Bradley, Wilmington, Del., assignors to E. I. du Pont de Nemours & Company, Wilmington, Del., a corporation of Delaware No Drawing. Application December 14, 1946, Serial No. 716,438

4 Claims. (Cl. 260—244)

This invention relates to new organic compounds useful as intermediates for the preparation of water-repellency agents.

It is known in the art to react long-chain aliphatic acyl amides with dry formaldehyde (trioxymethylene) in the presence of hydrogen chloride to produce an intermediate methyl chloride compound (R—CH₂Cl), which when treated with pyridine forms a water-soluble addition compound which is useful as a water-repellency agent (U. S. P. 2,296,412).

It is also old to treat a long-chain aliphatic acylamide, for instance stearamide, with dry formaldehyde (paraformaldehyde) in an alkaline medium to produce an intermediate methylol compound (R—CH₂OH). When this compound is treated with pyridine-hydrochloride it produces a water-soluble addition compound useful as a water-repellency agent (U. S. P. 2,146,392). According to the patentees the product is monomeric both before and after reaction with pyridine-hydrochloride. In the case of stearamide, the intermediate product is stearohydroxymethylamide (otherwise known as methylol stearamide) and corresponds to the formula $C_{17}H_{35}$—CONH—CH₂OH.

We have now found that if a long-chain aliphatic acyl amide is reacted with dry formaldehyde in the presence of an organic sulfonic acid, more especially an aromatic sulfonic acid, the reaction takes a still different course and a cyclic intermediate compound is obtained containing two of the long-chain acyl radicals therein.

The intermediate has a tetrahydro-oxadiazine structure, and may be expressed by the formula

R—CO—N——CH₂
        |        |
       CH₂    O
        |        |
R'—CO—N——CH₂ wherein R and R' are like or different hydrocarbon radicals, each containing an alkyl chain of at least 8 carbon atoms, but may be otherwise straight-chained or branched, saturated or unsaturated, and may contain also aromatic or cycloaliphatic radicals. In the preferred form of this invention, R and R' are straight-chain, saturated hydrocarbon radicals containing 11 to 29 carbon atoms.

If this intermediate is treated with hydrogen chloride, the oxadiazine ring opens up and the corresponding bis-chloromethyl compound of the formula R—CO—N—CH₂Cl
       |
      CH₂
       |
R—CO—N—CH₂Cl is formed. When the latter is treated with pyridine, a di-quaternary compound is obtained having the structure

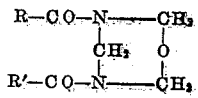

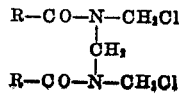

and being useful as a water-repellency agent. It will be noted that methylene-bis(acylamidomethyl-pyridinium chloride) compounds of this type have been prepared before by Rogers, U. S. P. 2,386,140, but he found it necessary to start with a methylene-bis-acylamide and react the same with paraformaldehyde and hydrogen chloride or with dichlor-dimethyl ether to produce an intermediate bis-chloromethyl compound. Furthermore, in Rogers' process the reaction requires a solvent, which entails the use of larger apparatus and the necessity of handling and recovering the solvent; it also gives the entire process a certain degree of fire hazard. The novel intermediate products of this invention, on the other hand, are of low melting point, and may therefore be treated with HCl directly in molten state, without resort to any solvents or diluents.

Accordingly, our invention contemplates the production of novel intermediates for water-repellency agents by reacting an acyl amide having an aliphatic chain of at least 8 carbon atoms, with dry formaldehyde in the presence of a catalytic quantity of an aromatic sulfonic acid.

Reaction is conveniently brought about by heating a mixture of the acylamide and paraformaldehyde in the presence of a catalytic quantity of an aromatic sulfonic acid at a temperature of about 140–150° C. for about one hour.

The formula of the product indicates that a minimum of 1.5 moles of formaldehyde are required for each mole of acylamide. In practice, an excess of para formaldehyde is preferably employed, say 2 moles (calculated as CH₂O) for each mole of acylamide. In some cases, it is advantageous to use about three moles of potential formaldehyde for each mole of amide. The amount of catalyst employed may vary between 0.5% and 10% based on the weight of amide used. The reaction may be carried out at atmospheric pressure or in a closed vessel at pressures up to 1000 lbs. per square inch. The reaction occurs rather slowly below 140° C. and the reaction mixture has a tendency to become solid. The latter handicap may be avoided by carrying out the reaction in an inert solvent, such as toluene, in which case temperatures as low as 100° C. may be used. The time cycle, however, is materially increased at such lower temperatures, and the procedure is less advantageous than working without a solvent.

Without limiting our invention, the following example is given to illustrate our preferred mode of operation. Parts mentioned are by weight.

*Example 1*

A mixture of 28.3 parts of a commercial mixture of stearamide and palmitamide (substantially equimolecular) and 1.0 part of p-toluene-sulfonic acid monohydrate is heated to 140° C. To this mixture are added 6.0 parts of paraformaldehyde over a period of one hour. The mixture is stirred vigorously throughout this period and for 15 minutes after addition is complete. The crude reaction product, which may contain up to 10% of methylene-diacylamides such as methylene-distearamide as impurities, melts at 52–55° C. The pure N,N'-diacyltetrahydro-1,3,5-oxadiazine can be obtained by crystallization of the crude product from acetone or methyl ethyl ketone. Analysis, calc. for $C_{37}H_{72}N_2O_3$ (based on an equimolecular mixture of stearic and palmitic acid derivatives): C, 75.00%; H, 12.16%; N, 4.73%. Found: C, 74.75%; H, 11.99%; N, 4.65%. A determination of active hydrogen by the Standard Zerevitinoff method showed essentially no active hydrogen.

Reaction of the above product with hydrogen chloride gives the corresponding methylene-bis-(acylamido-methyl chloride), and further treatment of the latter with pyridine gives the corresponding methylene-bis(acylamido-methyl-pyridinium chloride) of high purity and exceptionally high quality as a water-repellent.

The process of preparing our novel intermediate may be combined with the process of converting it into a water-repellency agent in a single continuous process, without isolating any intermediate products. This is illustrated in the following example:

*Example 2*

The procedure of Example 1 is followed up to and including the step of stirring vigorously for 15 minutes, following the addition of the paraformaldehyde. The molten mass is then cooled to 100° C. and hydrogen chloride is bubbled in for 1 hour, until a total of 4.2 parts of hydrogen chloride has been passed in. 8.5 parts of pyridine are then added slowly, with cooling and stirring, the temperature being held at 100–120° C. during this period. The product is then poured into a container.

The quaternary derivative formed in the above reaction is isolated by crystallization of the crude product from methyl-ethyl ketone. In order to remove the small amount of methylene-distearamide and methylene-dipalmitamide formed in the reaction, it is necessary to discard about the first 2.5 parts of product which separate on crystallization. The yield of purified product is 26.0 parts. The compound is a white crystalline solid melting at 85–90° C. as first isolated. On drying in a high vacuum the product is apparently dehydrated and then melts at 112–114° C. The hydrate can be regenerated by recrystallization from moist solvents. The product is soluble in warm water yielding a foaming solution. Analysis calc. for $C_{47}H_{82}N_4O_2Cl_2 \cdot 2H_2O$: N, 6.66%; Cl, 8.44%. Found: N, 6.70%; Cl, 8.25%. (The calculated values are based on an equimolecular mixture of stearic and palmitic acid derivatives.)

In lieu of p-toluene-sulfonic acid, benzene-sulfonic acid, chlorobenzene-sulfonic acid or any other convenient aromatic sulfonic acid of the benzene or naphthalene series may be employed, provided it is free of substituents (such as OH, $NH_2$ or $CONH_2$) which are reactive toward formaldehyde.

In lieu of the particular mixture of acylamides employed in this example, any other acylamide or mixture of acylamides of the group hereinabove discussed may be employed. As convenient, practical instances of such amides may be mentioned: pelargonamide, undecylamide, lauramide, myristamide, palmitamide, stearamide, oleamide, arachidamide, p-dodecylbenzamide, p-octadecylcyclohexane - carbonamide, 2 - methylstearamide, and 2-ethyl caprylamide.

We claim as our invention:

1. A compound of the general formula

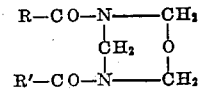

wherein R and R' stand for alkyl radicals having 8 to 30 carbon atoms.

2. The process of producing an intermediate for water-repellency agents, which comprises heating at a temperature of about 140° to 150° C., 1 mole of a fatty-acid amide having an alkyl chain of at least 8 carbon atoms with from 1.5 to 3 moles of dry formaldehyde and with from 0.5 to 10% by weight of an aryl sulfonic acid selected from the group consisting of benzene-sulfonic acid, p-toluene-sulfonic acid, chlorobenzene-sulfonic acid and naphthalene sulfonic acid, whereby to produce the corresponding N,N'-diacyl-tetrahydro-1,3,5-oxadiazine.

3. The process of producing an intermediate for water-repellency agents, which comprises heating at a temperature of about 140° to 150° C. substantially 1 mole of a mixture of stearamide and palymitamide with substantially 2 moles of paraformaldehyde (calculated as $CH_2O$) and with from 0.5 to 10% by weight of p-toluene-sulfonic acid, whereby to produce the corresponding N,N'-diacyl derivative of terahydro-1,3,5-oxadiazine.

4. A process as in claim 3, followed by recovery of said N,N'-diacyl-tetrahydro-1,3,5-oxadiazine by recrystallization of the crude mass in an inert organic solvent.

MADISON HUNT.
HARRIS WALTON BRADLEY.

No references cited.